United States Patent
Koegel et al.

(10) Patent No.: US 8,255,455 B2
(45) Date of Patent: Aug. 28, 2012

(54) METHOD AND SYSTEM FOR MESSAGE ORIENTED MIDDLEWARE VIRTUAL PROVIDER DISTRIBUTION

(75) Inventors: Michael Koegel, Roemerberg (DE); Sabine Heider, Neckargemuend (DE)

(73) Assignee: SAP AG, Walldorf (DE)

( * ) Notice: Subject to any disclaimer, the term of this patent is extended or adjusted under 35 U.S.C. 154(b) by 958 days.

(21) Appl. No.: 11/322,512

(22) Filed: Dec. 30, 2005

(65) Prior Publication Data

US 2007/0156808 A1    Jul. 5, 2007

(51) Int. Cl.
*G06F 15/16*    (2006.01)
*G06F 15/173*    (2006.01)

(52) U.S. Cl. ........ 709/203; 709/223; 709/224; 709/225; 709/227

(58) Field of Classification Search .................. 709/201, 709/202, 317, 203, 223, 224, 227; 719/310; 714/4

See application file for complete search history.

(56) References Cited

U.S. PATENT DOCUMENTS

| | | | |
|---|---|---|---|
| 6,738,975 B1 * | 5/2004 | Yee et al. ....................... | 719/310 |
| 7,500,133 B2 * | 3/2009 | Galchev et al. ................... | 714/4 |
| 2003/0014554 A1 * | 1/2003 | Williamson et al. .......... | 709/313 |
| 2004/0098490 A1 * | 5/2004 | Dinker et al. .................. | 709/229 |
| 2005/0240654 A1 * | 10/2005 | Wolber et al. ................. | 709/206 |
| 2005/0240663 A1 * | 10/2005 | Wolber et al. ................. | 709/220 |
| 2005/0270973 A1 * | 12/2005 | Raev et al. .................... | 370/218 |

\* cited by examiner

*Primary Examiner* — Asad M Nawaz
*Assistant Examiner* — Stephanie Chang
(74) *Attorney, Agent, or Firm* — Schwegman, Lundberg & Woessner, P.A.

(57) ABSTRACT

A method, apparatus, and system are provided for Message Oriented Middleware virtual provider distribution. In one embodiment, MOM nodes are created. An MOM virtual provider from MOM virtual providers is selected for each of the plurality of MOM nodes. The MOM nodes run the MOM virtual providers.

14 Claims, 12 Drawing Sheets

METHOD AND SYSTEM FOR MESSAGE ORIENTED MIDDLEWARE VIRTUAL PROVIDER DISTRIBUTION

FIELD

Embodiments of the invention generally relate to the field of Message Oriented Middleware (MOM) and more particularly, but not exclusively, to providing MOM virtual provider distribution.

BACKGROUND

Traditional client-server systems employ a two-tiered architecture such as that illustrated in FIG. 1. Applications 102 executed on the client side 100 of the two-tiered architecture are comprised of a monolithic set of program code including a graphical user interface component, presentation logic, business logic and a network interface that enables client 100 to communicate over network 103 with one or more servers 101. A database 104 maintained on server 101 provides non-volatile storage for the data accessed and/or processed by application 102.

As is known in the art, the "business logic" component of the application represents the core of the application, for example, the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1 become apparent when employed within a large enterprise. For example, installing and maintaining up-to-date client-side applications on a large number of different clients is a difficult task, even with the assistance of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 2. In the multi-tiered system, presentation logic 221, business logic 222 and database 223 are logically separated from the user interface 220. These layers are moved off of client 225 to one or more dedicated servers on network 203. For example, presentation logic 221, business logic 222, and database 223 may each be maintained on separate servers, 226, 227 and 228, respectively.

This separation of logic components and the user interface provides a more flexible and scalable architecture compared to that provided by the two-tier model. For example, the separation ensures that all clients 225 share a single implementation of business logic 222. If business rules change, changing the current implementation of business logic 222 to a new version may not require updating any client-side program code. In addition, presentation logic 221 may be provided which generates code for a variety of different user interfaces 220, which may be standard browsers such as Internet Explorer® or Netscape Navigator®.

Although the multi-tiered system illustrated in FIG. 2 provides a more flexible architecture, it also results in significant additional complexity. For example, the distributed nature of applications and components within the multi-tiered system makes it more complicated for the applications and components to communicate with each other. A class of middleware known as MOM may be used to facilitate communication between applications and components.

An MOM refers to computer software that provides a message service between software components or applications. The message service provided by the MOM is often referred to as "loosely coupled" because a component sends a message to a destination and the recipient can retrieve the message from the destination. A message service typically includes a message provider and one or more clients. The message provider facilitates, for example, creating, sending, receiving, and reading messages. A client uses the message provider to, for example, send a message to a destination and another client may use the message provider to retrieve the message from the destination.

Although the message service facilitates communications between distributed software components and applications, it also reduces some of the flexibilities of the multi-tiered architecture. For example, the scalability of the multi-tiered architecture may be constrained by the capacity of a central message provider. Also, the central message provider requires a relatively brittle namespace scheme to ensure that messages are properly delivered. Furthermore, the malfunctioning applications on the same node as the MOM can negatively impact the MOM and other applications using the MOM through other nodes.

SUMMARY

A method, apparatus, and system are provided for Message Oriented Middleware virtual provider distribution. In an embodiment, MOM nodes are created. An MOM virtual provider from MOM virtual providers is selected for each of the plurality of MOM nodes. The MOM nodes run the MOM virtual providers.

The above attributes may be implemented using a computer program, a method, a system, an apparatus, or any combination of computer programs, methods, or systems. These and other details of one or more embodiments of the invention are set forth in the accompanying drawings and in the description below.

BRIEF DESCRIPTION OF THE DRAWINGS

Embodiments are illustrated by way of example and not by way of limitation in the figures of the accompanying drawings in which like references indicate similar elements unless otherwise specified. It should be noted that references to "an" or "one" embodiment in this disclosure are not necessarily to the same embodiment, and such references mean at least one.

DETAILED DESCRIPTION

Figure 1:
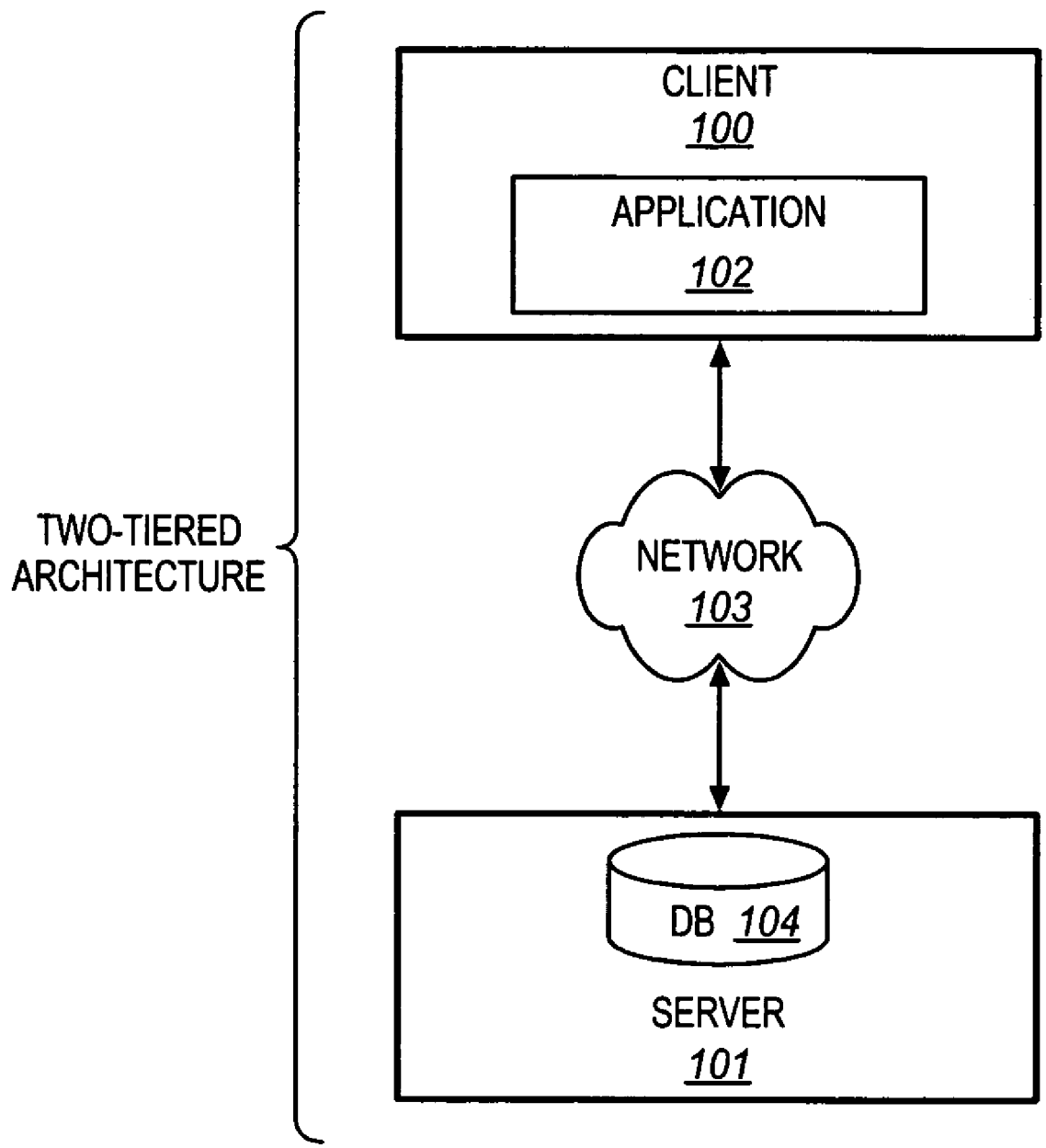
FIG. 1 illustrates a prior art two-tiered client-server architecture.
Figure 2:
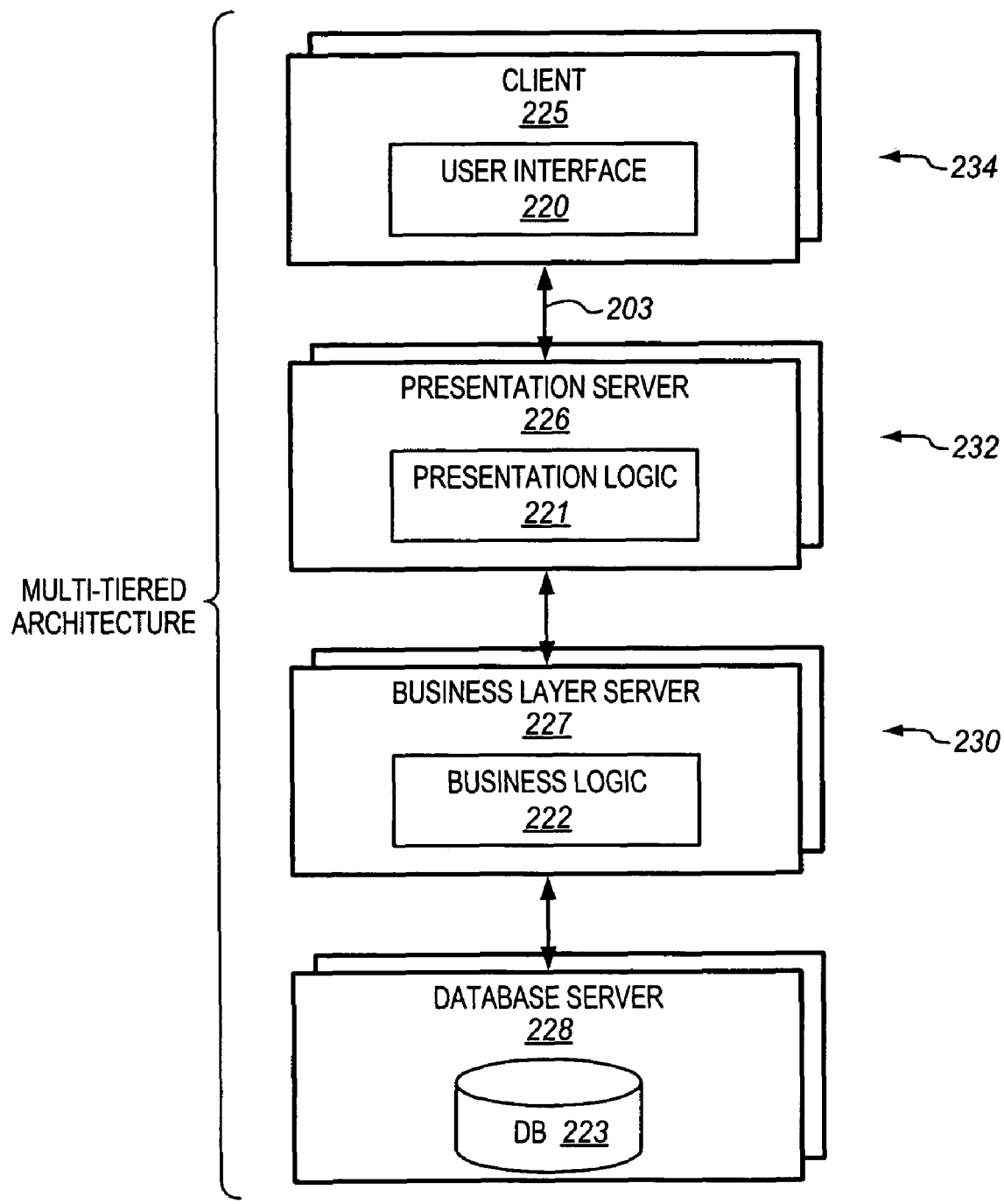
FIG. 2 illustrates a prior art multi-tiered client-server architecture.
Figure 3:
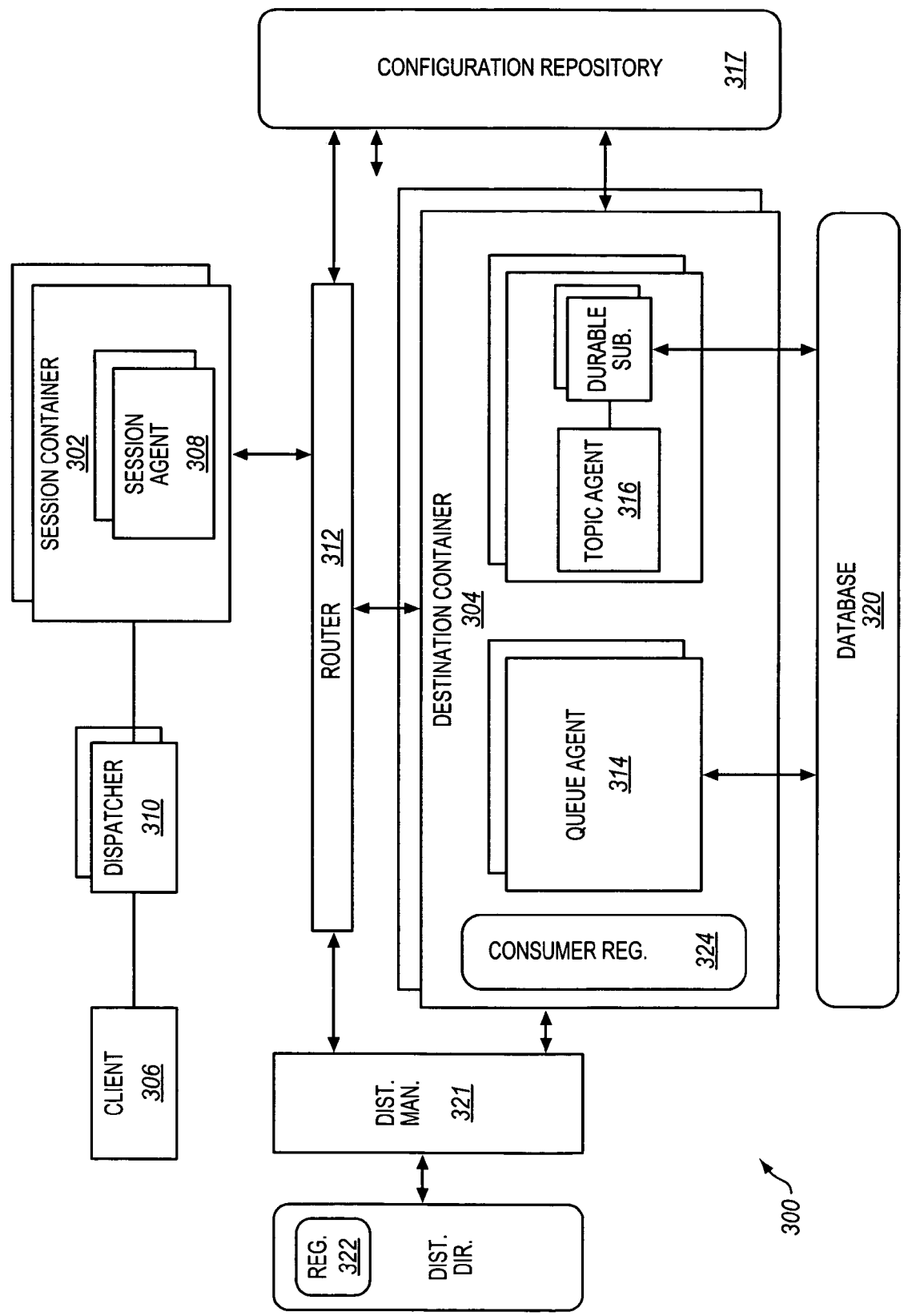
FIG. 3 illustrates an embodiment of Message Oriented Middleware provider.

FIG. 3 illustrates an embodiment of a Message Oriented Middleware provider 300. As is further discussed below, MOM provider 300 may be integrated into a multi-tiered network (e.g., the multi-tiered network illustrated in FIG. 2). The multi-tiered network may be implemented using a variety of different application technologies at each of the layers of the multi-tier architecture, including those based on the Java 2 Enterprise Edition™ (J2EE) platform, the Microsoft NET platform, the Websphere platform developed by IBM Corporation, and/or the Advanced Business Application Programming (ABAP) platform developed by SAP AG.

In one embodiment, MOM provider 300 is implemented on an application server. The term "application server" broadly refers to a computing device that performs data processing. In a multi-tiered environment, such as the one illustrated in FIG. 2, application servers may provide the business logic for the distributed system. In an embodiment in which the business logic (e.g., business logic 222, shown in FIG. 2) exchanges information with a user interface (e.g., user interface 220, shown in FIG. 2) via the Internet, the application servers providing the business logic may be described as Web application servers.

MOM provider 300 may be separated into two main layers: session container 302 and destination container 304. Session container 302 is responsible for session and connection related tasks. The term "session" refers to an active connection between two elements of a distributed system (e.g., between two applications, between two components, between an application and a component, etc.). The term "connection" refers to a connection between an MOM client and the MOM provider.

When a client creates an MOM connection (e.g., via a directory lookup) the connection is bound to a session container (e.g., session container 302). All sessions created on the connection may also be bound to the session container. Session container 302 may manage the connections and sessions of multiple clients (e.g., client 306). Further, session container 302 includes a logical session agent 308 for each session it is managing. Session agent 308 may process (and/or preprocess) all requests for an MOM session using one or more logical handlers. The term "handler" refers to a software routine that performs a particular task. Examples of handlers provided by session agent 308 may include, and are not limited to, security management, logging, monitoring, transaction management, etc.

In operation, client 306 may send an MOM message to dispatcher 310 to be distributed to a destination. Session container 302 may accept the message and forward it to session agent 308. Session agent 308 may process the message and send it to router 312. Router 312 may be a logical component that transmits messages between session container 302 and destination container 304. Router 312 may include router code and/or may use the internal communication system of the application server.

Destination container 304 is responsible for executing the core messaging functions of storing messages (e.g., in volatile memory and/or persistently), maintaining the order of messages, and distributing the messages to the proper recipients. Destination container 304 includes all of the destination agents (e.g., queue agent 314 and topic agent 316) that are bound to the application server on which destination container 304 is implemented. The term "destination agent" refers to a software agent that is responsible for handling the messaging operations of a particular destination. In an embodiment, the destination agents are maintained in volatile memory as data structures for all destinations that are "active." The term "active" may refer to a destination that has at least one consumer or producer attached.

MOM provider 300 may support one (or both) of the messaging schemes known as point-to-point and publish/subscribe messaging. In point-to-point messaging, each message is addressed to a specific queue. The term "queue" refers to a storage space either in memory or a persistent store (e.g., a database) for messages that are addressed to a particular client. A client establishes the queue to hold its messages. The queue may retain all messages sent to it until the messages are consumed or until they are expired.

In a publish/subscribe messaging scheme, a client addresses a message to a topic. The term "topic" refers to a storage space either in memory or a persistent store (e.g., a database) for messages that may be accessed by clients that subscribe to the topic. The topic may retain messages for as long as it takes to distribute the messages to all clients. Furthermore, queue agent 314 handles all messages for a particular queue (e.g., a queue in database 320 and/or in volatile memory). In one embodiment, queue agent 314 manages the order of messages within an associated queue. In such an embodiment, a separate queue agent 314 exists for each queue managed by destination container 304.

Topic agent 316 handles all messages sent to an associated topic. In such an embodiment, topic agent 316 includes logic to maintain the associated topic in volatile memory. In addition, topic agent 316 may include memory swapping logic to swap data between volatile memory and, for example, database 320. In an alternative embodiment, topic agent 316 includes logic to maintain the associated topic on database 320 (in addition to or instead of maintaining the topic in volatile memory).

Distribution manager 321 creates agents, as needed, for MOM provider 300 and its logical MOM server instances. For example, distribution manager 321 may create session agent 308, queue agent 314, and/or topic agent 316, as needed. In an alternative embodiment, destination agents (e.g., queue agent 314 and/or topic agent 316) are created by an appropriate AgentHandler for each destination that becomes active. In addition, session contexts may implement the functionality of session agents 308. A SessionHandler for each client session may create a session context and the session context may be stored in the corresponding connection context.

Router 312 and distribution manager 321 make use of one or more directories and repositories that store information for MOM provider 300. In an embodiment, destination registry 322 stores the physical location of the agents (e.g., queue agent 314 and/or topic agent 316) responsible for each destination. In an alternative embodiment (e.g., in which destination registry 322 is not implemented), destinations and related objects (e.g., queue agent 314 and/or topic agent 316) that belong to a given logical MOM server instance (e.g., logical MOM server instance 420, shown in FIG. 4) are hosted on the "parent" server node (e.g., application server 400, shown in FIG. 4). Consumer registry 324 maintains a list of consumers for each destination in destination container 304. Configuration repository 317 may store configuration information for MOM entities such as MOM server instances, queues, topics, durable subscriptions, and the like.

Database 320 may persistently store messages for queues and/or durable subscriptions. The term "durable subscription" refers to receiving messages at a topic for a client that is not active (e.g., not currently connected to the topic). In addition, database 320 may store data that is "swapped" in and out of volatile memory to conserve system resources. In an embodiment, database 320 includes a Database Management System (DBMS). The term "DBMS" refers to logic that provides overall organization of the data within a database. For example, a DBMS may retrieve the data from the database and/or ensure integrity of the data within the database. In an embodiment, the DBMS may be a "relational" DBMS (or simply, RDBMS).

Figure 4:
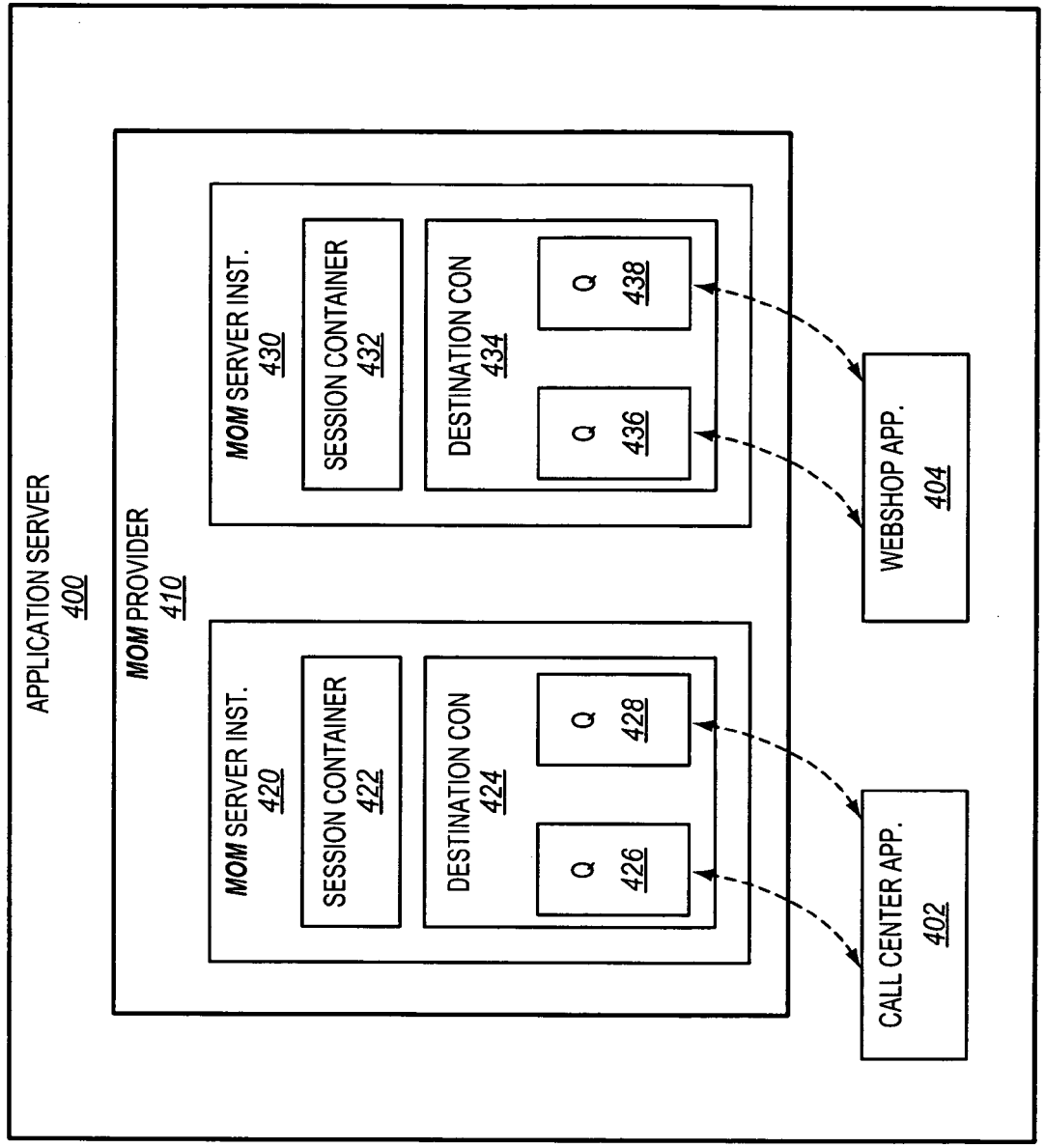
FIG. 4 illustrates an embodiment of selected elements of an application server.

FIG. 4 illustrates selected elements of an embodiment of an application server 400. Applications 402 and 404 are deployed to application server 400. Application 402 may be, for example, a call center application and application 404 may be a "Webshop" application. The term "Webshop" refers to buying and selling goods over the Internet.

MOM provider 410 provides a message service for applications and components executing on application server 400. MOM provider 410 includes logical MOM server instances 420 and 430. Logical MOM server instances 420 and 430 may be defined by separate configuration entities that specify, for example, identifiers for the logical instances, identifiers for the destinations, which destinations are assigned to which logical instance, and the like. For purposes of explanation, an embodiment of the invention having two logical MOM server instances is described. It is to be understood however, that only one server instance or more than two server instances may configured.

Initially, only one of applications 402 and 404 may be deployed on application server 400 and only one logical MOM server instance is configured. For example, call center application 402 may be deployed and logical MOM server instance 420 may be configured to provide a message service for call center application 402. In such an embodiment, the configuration options of MOM server instance 420 may be optimized for call center application 402. For example, session container 422 may be configured to provide one or more message sessions for application 402. Also, destination container 424 may be configured to provide queues 426 and 428 for application 402.

A potential challenge occurs, however, when Webshop application 404 is deployed to application server 400. It is possible that Webshop application 404 uses a queue that has the same name as one of the queues used by application 402. For example, call center application 402 may have two queues: QIncomingCalls 426 and QOrders 428. Similarly, Webshop application 404 may have the following two queues: NewUserRequest 436 and QOrders 438.

Logical MOM server instance 430 may be configured to separate the namespaces of the queues used by applications 402 and 404. For example, session container 432 may be configured to provide one or more message sessions for application 404. Destination container 434 may be configured to provide NewUserRequest queue 436 and QOrders queue 438. Since a separate logical MOM server instance is providing a message service for application 404, there is no conflict in the namespaces used by the queues of application 404 and the queues of application 402. In addition, it is easier to administer and optimize MOM server instance 430 because it providers an MOM service to a specific application.

In one embodiment, application server 400 is a J2EE application server. The term J2EE application server broadly refers to an application server that implements, at least in part, one of the J2EE specifications, for example, v1.3, published on Jul. 27, 2001 (hereinafter, the J2EE Standard). Examples of a J2EE application server may include, for example, the Web Application Server (Web AS) provided by SAP AG and the Websphere application server by IBM Corporation. In an alternative embodiment, application server 400 is implemented according to a different platform, for example, the Microsoft NET platform.

In one embodiment, logical MOM server instances 420 and 430 may include Java Messaging Service (JMS)-based MOM server instances. A JMS-based server instance may broadly refer to an MOM server instance that implements, at least in part, the JMS application program interface (API). In an alternative embodiment, logical MOM server instances 420 and 430 may be based on a different messaging API.

A logical MOM server instance (e.g., logical MOM server instance 420, shown in FIG. 4) may be specified by a configuration entity having one or more items of configuration information. The configuration information established for each MOM server instance may be used to distribute and process messages (e.g., the configuration information may be used to identify a "name" of a server instance).

It is to be noted that JMS, JMS-based instances, JMS providers, JMS nodes, and other JMS-related components, modules, and functionalities are described in the following figures and mentioned throughout this document merely as an example and for brevity and clarity. Embodiments of the invention are not exclusive or limited to only JMS and may include and/or related to other MOM-related features, components, and functionalities. As described with reference to FIG. 4, in one embodiment, logical MOM server instances may include JMS-based MOM server instances. A JMS-based server instance may broadly refer to an MOM server instance that implements, at least in part, the JMS API. In an alternative embodiment, logical MOM server instances may be based on a different messaging API. Furthermore, any MOM architecture/structure or JMS architecture/structure described throughout this document may reside at an application server (e.g., application server 400), such as a J2EE application server which may include, for example, the Web Application Server (Web AS) provided by SAP AG, the Websphere application server by IBM Corporation, etc. In an alternative embodiment, application server 400 is implemented according to a different platform, such as, the Microsoft .NET platform.

Figure 5:
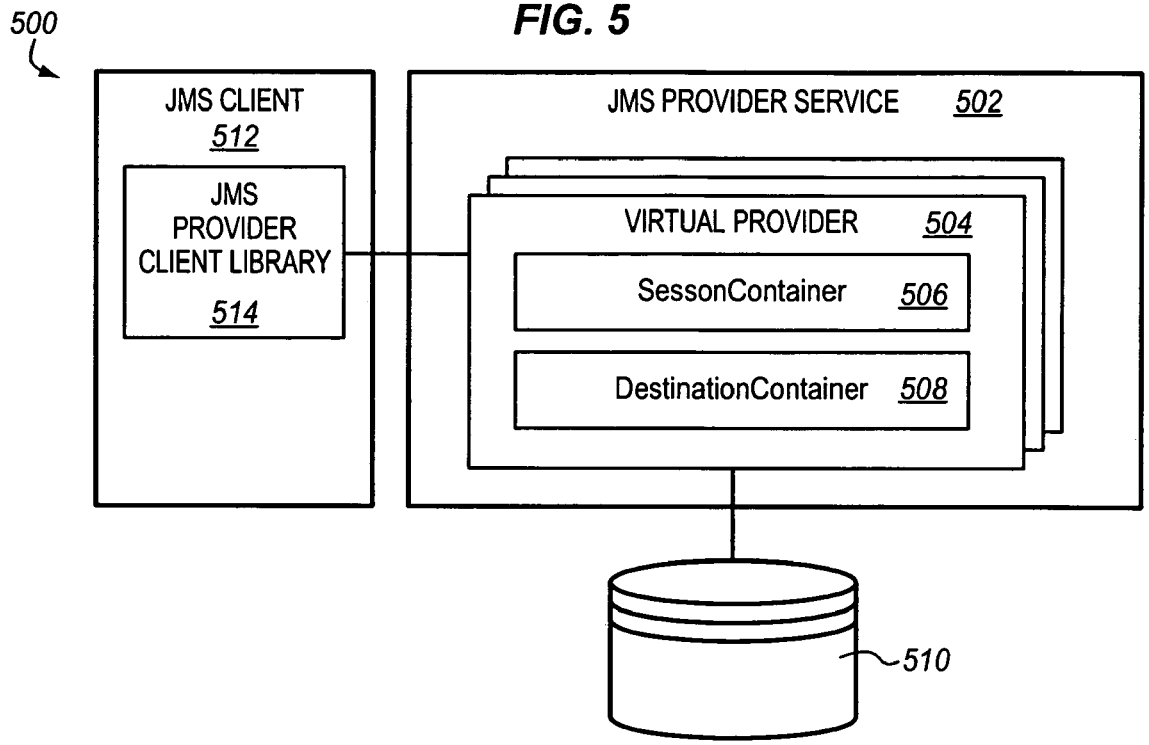
FIG. 5 illustrates an embodiment of a Message Oriented Middleware architecture.

FIG. 5 illustrates an embodiment of a Message Oriented Middleware architecture 500. MOM architecture 500 includes an embodiment of an MOM provider (e.g., JMS provider) and MOM provider-related components (e.g., JMS provider-related components). In the illustrated embodiment, MOM architecture 500 includes JMS provider service 502 that runs on each node or virtual machine (VM) (e.g. Java VM (JVM)) in a cluster of nodes to provide the main functionality for applications using JMS. Further, JMS provider service 502 can divide into several components and sub-components. JMS provider service 502 is coupled to and in communication with JMS client 512. JMS client 512 includes JMS provider client library 514 that is used by each application or service that is to use JMS provider service 502 and JMS virtual provider 504. JMS provider client library 514 may also implement various interfaces (e.g., javax.jms), handle the communication with JMS provider service 502, and optimize the client performance by buffering messages on the client side. Provider service 502 is coupled to and in communication with database 510.

JMS virtual provider 504 includes a JMS provider with a namespace. Each virtual provider 504 may include a set of JMS administered objects. Such administered objects from different virtual providers 504 may not be mixed or mingled, such as a "ConnectionFactory" from virtual provider A may not be used to create a "Producer for a Queue" that is hosted at virtual provider B. Applications that communicate with each other use the JMS that uses the same virtual provider 504. Further, the JMS load generated by one application can be separated from other applications by giving that application a dedicated virtual provider 504 such that as a single virtual provider 504 is bound to a single corresponding JVM. JMS virtual provider 504 further provides various components (e.g., JMS server frame, JMS server container, etc.) that are used to implement the needed interfaces to allow JMS virtual provider 504 to run as a service at or inside an engine, such as the J2EE engine. The functionality of such interfaces includes lifecycle for the service, cluster awareness, eventing, and general infrastructure access. Further, these interfaces serve as communication endpoints for JMS provider client library 514.

JMS virtual provider 504 further provides containers, such as session container 506 and destination container 508. Session container 506 manages connections, sessions, producers, and consumers created by clients. Destination container 508 may be part of a server to hold and manage the data structures that contain JMS messages. Further, destination container 508 contains message repository, work lists, consumer view, and persistency service. A message repository includes central part of the queuing engine and is responsible for providing JMS messages in the correct order. The message repository also maintains an order-aware message cache, but also accesses the database 510. Further, the message repository includes a message directory and a master queue.

A message directory may contain hash maps and/or persistent and non-persistent messages, and message request objects that are being processed and/or stored at master queue. The message directory further contains the message request objects that are stored in the master queue as well as those currently being processed. A message directory serves the following purposes: (1) providing access to message objects; and (2) avoiding duplicate creation of objects for the same JMS messages; for example, whenever a message is read from database 510, a message directory is first checked for an already existing related message object. The master queue represents a part of the message queue in the memory. Further, the master queue contains available messages, without any gaps, between the first message and the last message. When a new message arrives that has a higher priority than the last message in the master queue, it is inserted into the appropriate position immediately.

A work list represents the part of a message queue that is being currently processed by a consumer. It is not to be confused with the master queue. The master queue is a message cache which respects the message order. The work list, on the other hand, uses this cache, but it may also get messages from the database. Since topic consumers receive and process the messages independently of each other, there is a separate work list object assigned to each consumer. A work list contains an array that can be considered a "cursor" indicating the current position within the message queue. It can point to a message within the master queue as well as to any message outside. Each work list has its own priority queue, which is used to buffer messages that need to be delivered to the consumer but are not contained in the master queue. The objects within this queue are message handles and are relatively small objects which contain a reference to the actual message. The message handles are taken from a pool of handles when required and are later, returned. There is, however, no distinction between work lists that are with or without a message selector.

For each consumer, there is a consumer view object representing a subset of the message queue specific to that consumer. It is called by a topic agent and interacts in turn with its related work list. A persistency service is regarded as the central point for persisting JMS messages to a relational database and retrieving them again.

Figure 6:
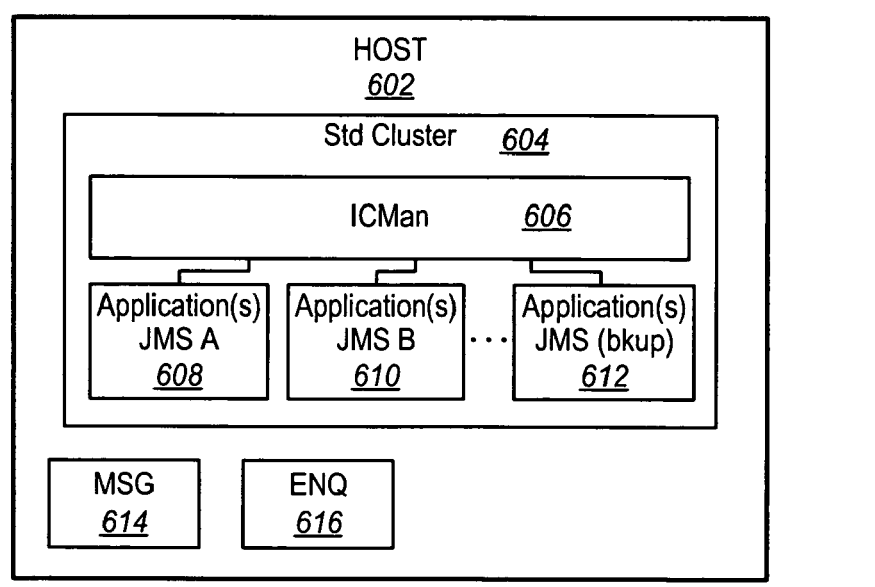
FIG. 6 illustrates an embodiment of a Message Oriented Middleware architecture.

FIG. 6 illustrates an embodiment of a Message Oriented Middleware architecture 600. MOM architecture 600 includes a JMS structure that includes host 602 having multiple nodes (e.g., VMs) 608-612. Each occupied node 608-610 includes an MOM virtual provider (e.g., JMS virtual provider). In one embodiment, a set of JMS resources that are needed to handle the sum of all JMS clients can be divided into a number of subsets. Each subset is handled by a separate JMS virtual provider associated with a node 608-610. In other words, each of the multiple virtual providers runs on a separate corresponding node or VM 608-610 in cluster 604, leveraging the available system resource more fully and properly than having multiple JMS virtual providers running on a single node or VM could. Furthermore, if there are more nodes available (e.g., node 612) than the number of available virtual providers, such remaining nodes without an assigned virtual provider are set up to act as backup nodes, such as node 612, ready to take over the duties of those virtual providers whose corresponding nodes 608-610 should fail. In the illustrated embodiment, each node 608-612 in cluster 604 is uniformly assigned to run the application load as well as the JMS load. Host 602 further includes messaging server 614 and enqueuing (ENQ) server 616.

Figure 7:
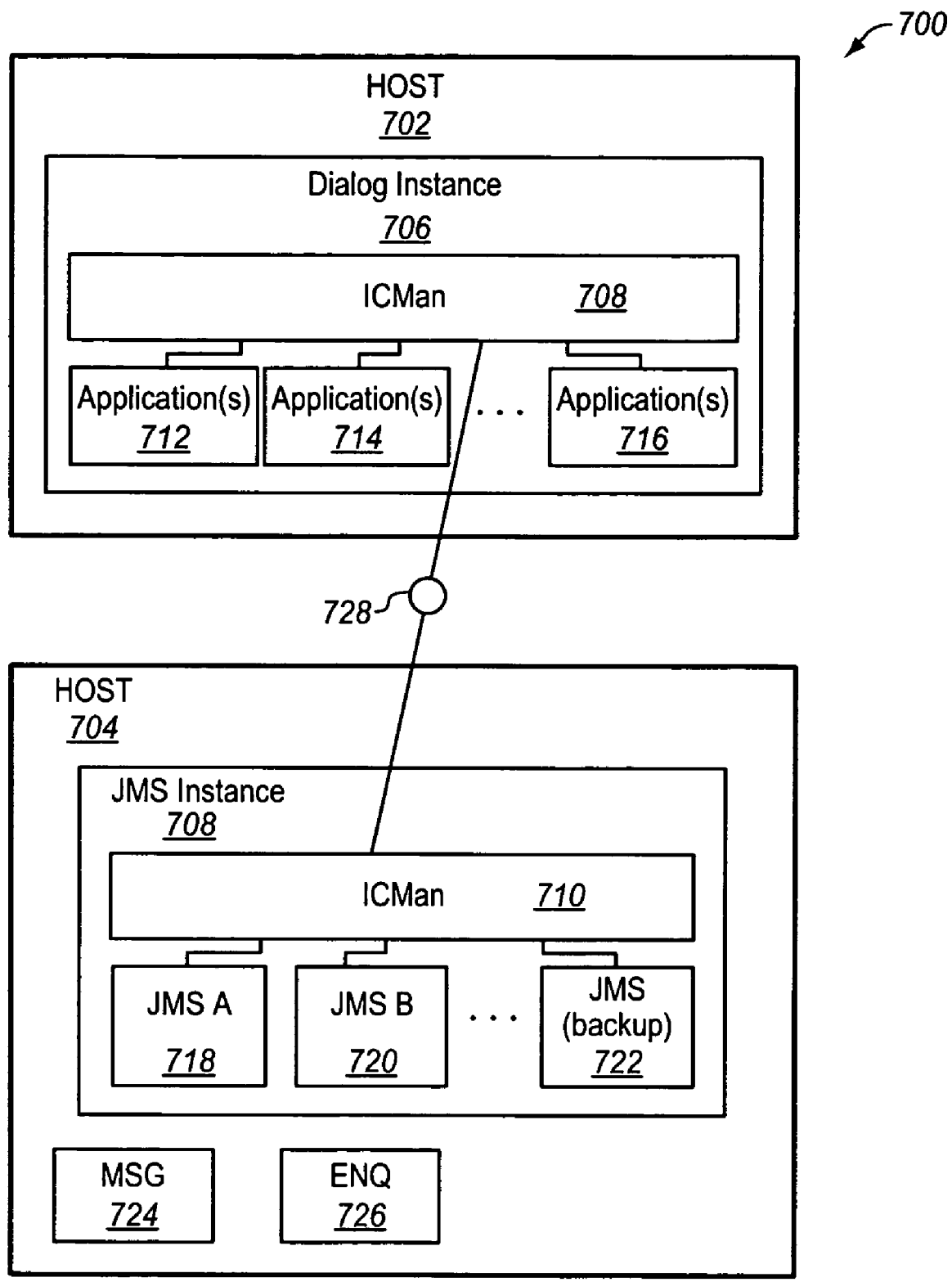
FIG. 7 illustrates an embodiment of a Message Oriented Middleware architecture.

FIG. 7 illustrates an embodiment of a Message Oriented Middleware architecture 700. MOM architecture 700 includes a JMS architecture/structure. In one embodiment, using an installation option, the JMS load is separated from the application load by providing a separate set of nodes (e.g., JVM) 718-722 that are dedicated to running the JMS load. In one embodiment, JMS node 722 serves as a backup node that is made available so that in the event that the failure of an already operating JMS node 718-720 is detected, the orphan virtual provider from that corresponding failed node is immediately and seamlessly reclaimed by backup JMS node 722. For example, using this backup node technique, the orphan virtual provider from a failed node may be reclaimed within seconds. In the absence of a backup node, such as JMA backup node 722, the downtime of the orphan or impacted virtual provider is typically as long as it takes to restart a node (e.g., several minutes) which is inefficient and wasteful. These JMS nodes 718-722 at JMS instance 708 are separate from application nodes 712-716 that handle or run the application load at default or standard or dialog instance 706. In one embodiment, an installation option is used to provide an installation instance that includes JMS instance 708 where a number of nodes 718-722 that are dedicated to JMS are hosted. The installation option provides for various modules and/or components to facilitate (1) the installation of JMS instance 708, (2) recognize the available standard nodes or VMs at dialog instance 706 running the application and JMS loads, (3) provide JMS instance 708 where JMS nodes 718-722 are hosted, and (4) extract the JMS load from standard nodes leaving the standard nodes as application nodes 712-716 running only the application load, while JMS nodes 718-722 are used to the separated JMS load. In one embodiment, an instance (e.g., JMS instance, dialog instance 706, etc.) includes an administrative unit that groups various components of a system (e.g., SAP system) that provides one or more services. These services are started, stopped, and monitored at the same time. The components belonging to an instance are provided with parameters using a common instance profile. For example, a single SAP system may contain a single instance in which the required SAP services are provided.

In one embodiment, JMS nodes 718-722 do not run applications and are dedicated to JMS. Having JMS nodes 718-722 that are dedicated to the JMS service, the resources available to such nodes 718-722 can be fully leveraged by the JMS service. For example, a much bigger part of the memory can be used for caching messages than could be used without JMS-dedicated nodes 718-722. In one embodiment, host 704 further includes messaging server 724, ENQ server 726 and database that are also used by host 702 coupled to host 704. These messaging and ENQ servers 724-726 and the database may reside at a separate host or server, i.e., at host or server other than hosts 702-704. In one embodiment, host 702 communicates with host 704 using a protocol 728, such as the one transferred by SAP P4 Remote Method Invocation (RMI) implementation.

Each virtual provider is assigned a JMS node 718-722. Each JMS node 718-722 may run the assigned virtual provider to run the JMS load. Application nodes 712-716 run applications at dialog instance 706. In one embodiment, if the JMS nodes exceed the number of JMS virtual providers available for running, these remaining JMS nodes are regarded as backup nodes 722 without having being assigned a virtual provider. Backup nodes 722 are used to seamlessly and immediately (e.g., within seconds) take over the operation of those virtual providers whose corresponding JMS nodes 718-720 have failed. For example, in case of the failure of JMS node 718, JMS backup node 722 immediately takes over the running of the virtual provider corresponding to JMS node 718 that has failed. Each JMS virtual node having run on separate JMS nodes 718-722 and having nodes 718-722 dedicated to JMS allows for leveraging of the available system resources more fully, properly, and efficiently than having nodes that run both JMS and applications or having a single JMS node run all the JMS virtual providers. In other words, in the illustrated embodiment, various individual JMS nodes 718-722 are provided to individually run each of the JMS virtual providers, resulting in an even greater leveraging of available system resources.

For example, JMS nodes 718-722 can provide the usage of more than one JVM that is used to reach the necessary throughput which may be needed when a particular or unconventional JVM may be used that does not scale as well into high numbers of parallel threads than traditional JVMs. Furthermore, the intrinsic nature of JMS destinations may require strict message ordering which in turn may not allow the distribution of such destinations without global access synchronization to not compromise the message order. Also, having separate and multiple JMS-dedicated nodes 718-722 helps prevent a global synchronization that would otherwise impose a very high performance overhead which requires the number of destinations being handled by a single JVM or node. Furthermore, employing separate and multiple JMS-dedicated nodes 718-722 automatically provides the needed QoS to keep separate the application load from the rest of the JMS load to allow the system resources for individual tuning and to avoid the demanding JMS usage scenarios that the combined usage of running the application and JMS loads at a single node requires. Also, JMS nodes 718-722 help separate a JMS load from an application load to prevent the stopping of ongoing JMS sessions that are often dropped which impacts user sessions hosted on other nodes when a node exceeds a threshold, such as in terms of lifetime, memory consumption, etc. Separate JMS nodes 718-722 provide a stability of performance, lower computer processing unit (CPU) consumption, and additional resources for memory cache, shortcuts to database, etc.

Figure 8:
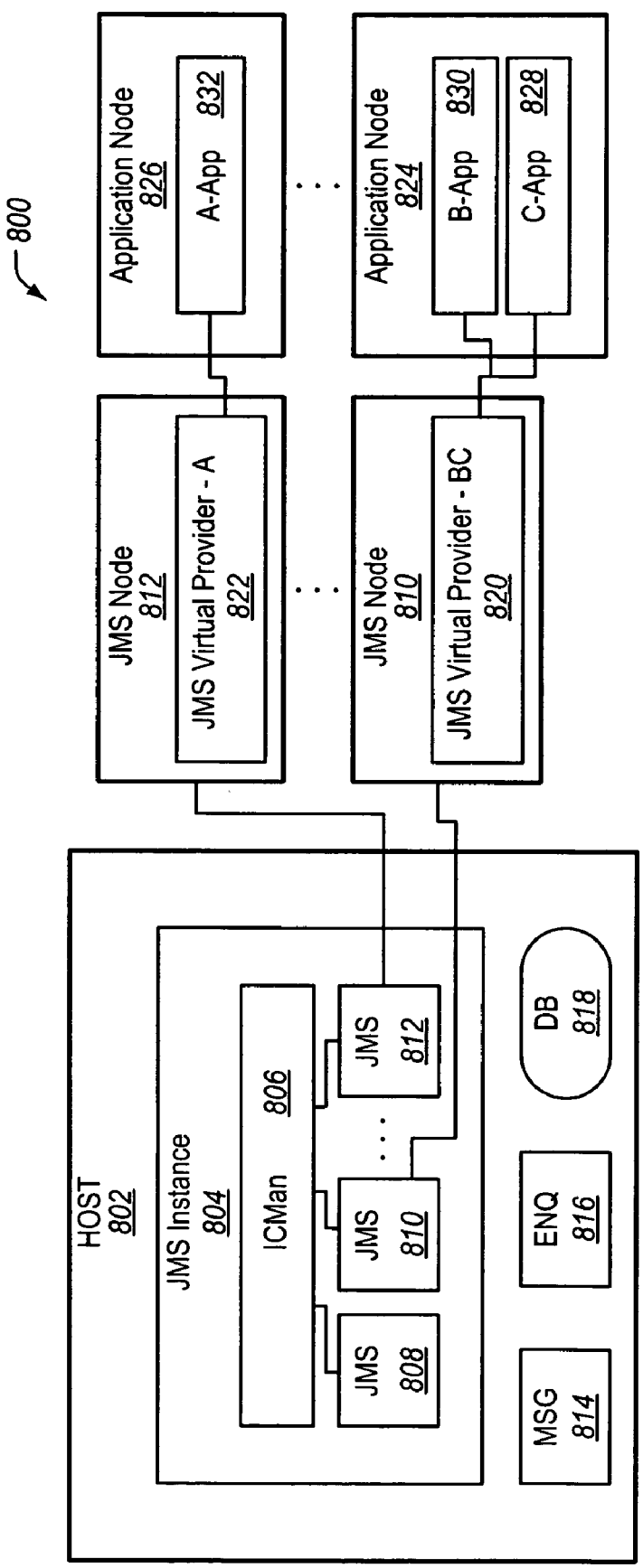
FIG. 8 illustrates an embodiment of a Message Oriented Middleware virtual provider distribution architecture.

FIG. 8 illustrates an embodiment of a Message Oriented Middleware virtual provider distribution architecture 800. An example of MOM virtual provider distribution architecture 800 includes a JMS virtual provider distribution architecture as described herein. In one embodiment, each JMS node (e.g., JVM) 808, 810, 812 is equipped with running a JMS virtual provider 820, 822. In the illustrated embodiment, JMS node 808 is regarded as a backup node, which means it does not yet have a JMS virtual provider assigned to it and that it is to take over the responsibilities of running those virtual providers 820, 822 that are running at other JMS nodes 810, 812 if and when one or more of those nodes were to fail. In one embodiment, virtual providers 820, 822 may then be assigned to applications 828, 830, 832 running at standard or application node 824, 826. For example, JMS virtual provider A 822 at JMS node 812 corresponds to application A 832 at application node 826. Similarly, JMS virtual provider BC 820 at JMS node 810 corresponds to applications B, C 828-830 at application node 824. In one embodiment, although illustrated here as running on separate application nodes 824-826, all of applications A, B, C 828, 830, 832 may run on all of application nodes 824, 826.

In one embodiment, although each JMS node 810, 812 is assigned a single JMS virtual provider 820, 822, a single virtual provider 820 may be assigned to multiple applications B, C 828, 830. Applications A, B, C 828, 830, 832 may represent a single or multiple applications running on each of application nodes 824, 826. Further, a single application node 824 may run multiple applications 828, 830. As illustrated, and as discussed above, each application 828, 830, 832 shares or corresponds to a single virtual provider 820, 822, while a virtual provider 820, 822 (such as virtual provider 820) may share or correspond to multiple applications 828-830 (such as applications B, C 828, 830). In one embodiment, the assignment of virtual providers 820-822 to applications 828-832 may be predetermined and done automatically using one or more modules and/or components. Any conflicting applications that specify the JMS node (e.g., applications that cannot co-exist at the same node) may be blocked at the deployment time. Further, a session failover may be gained if sessions and destinations are held in a shared memory.

Figure 9:
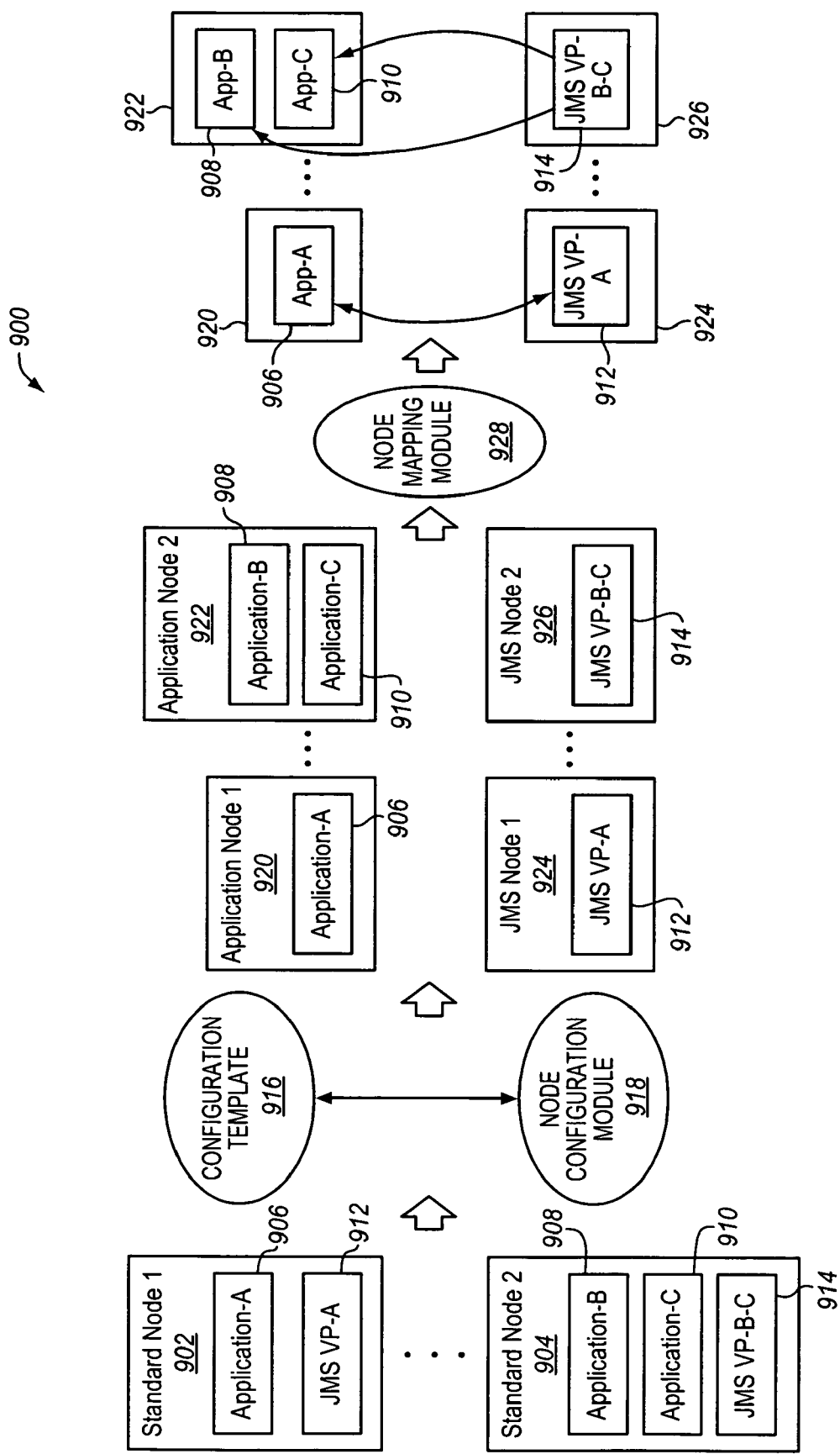
FIG. 9 illustrates an embodiment of an architecture for generating and mapping Message Oriented Middleware nodes.

FIG. 9 illustrates an embodiment of an architecture 900 for generating and mapping Message Oriented Middleware nodes 924, 926. It is to be noted that in one embodiment and for clarity and simplicity, applications A, B, C 906, 908, 910 are illustrated as running on separate application nodes 920, 922 (and separate standard nodes 902, 904). It is, however, contemplated that all applications 906, 908, 910 may run on all application nodes 920, 922 and/or all standard nodes 902, 904. For example, all of applications A, B, C 906, 908, 910 run on both application nodes 920, 922. As described elsewhere in this document, an example of MOM nodes 924, 926 includes JMS nodes (e.g., JVM). In the illustrated embodiment, standard nodes or VMs 1-2 902, 904 are identified as running applications 906-910 and JMS virtual providers 912, 914 running a JMS load. Nodes 902-904 are identified such that the JMS load may be separated along with JMS virtual providers 912, 914 from applications 906, 908, 910 so that JMS virtual providers 912, 914 can be hosted at JMS-dedicated nodes 924, 926 to run the JMS load.

In one embodiment, configuration template 916 and node configuration module 918 are used not only to separate the JMS load (e.g., JMS virtual providers 912, 914 are separated from nodes 1-2 902, 904), but also to create JMS-dedicated nodes 1-2 924, 926 that can run JMS virtual providers 912, 914. Configuration template 916 is different from a standard template in that configuration template 916 includes a JMS instance template having an installation option including various modules/components to provide a JMS instance to host JMS nodes 924-926 and to facilitate the generation of JMS nodes 924, 926 that are dedicated to running the JMS load via JMS virtual providers 912, 914. A standard template, on the other hand, includes a standard instance template that is used to create standard nodes 902, 904, which include applications 906, 908, 910 and JMS virtual providers 912, 914. In one embodiment, both the JMS instance template and the standard instance template are derived from a basic instance template. Further, node configuration module 918 may include various other modules (e.g., a JMS identification module, a JMS separation module, etc.) to separate the JMS load from standard nodes 902, 904 to be processed at JMS nodes 924, 926.

In one embodiment, JMS nodes 1-2 924-926 are JMS-dedicated to run JMS virtual providers A, B-C 912, 914 without having to share resources with applications A, B, C 906, 908, 910. As illustrated, each JMS node 924, 926 runs a single JMS virtual provider 912, 914. In one embodiment, application nodes 1-2 920, 922 that run applications A, B, C 906, 908, 910 may be the same as standard nodes 902, 904 without the JMS load or, in another embodiment, application nodes 920, 922 may be newly created to run applications A, B, C 906, 908, 910. Application nodes 1-2 920, 922 may also run other system operations in addition to running applications A, B, C 906, 908, 910 and may also contain some traces of JMS for administrative purposes.

In one embodiment, node mapping module 928 is employed and used to map JMS nodes 1-2 924, 926 to application nodes 1-2 920, 922. The mapping of JMS nodes 1-2 924, 926 to application nodes 1-2 920, 922 includes mapping JMS virtual providers A, B-C 912, 914 to applications A-C 906, 910. For example, as illustrated, JMS virtual provider A 912 at JMS node 1 924 is mapped or assigned or correspond to application A 906 at application node 1 920. Similarly, JMS virtual provider B-C 914 at JMS node 2 926 is mapped to applications B, C 908, 910 at application node 2 922.

In a cluster configuration, the core including JMS and an abstract default configuration may be deployed at a worker node level. Node configuration module 918 may inherit some or all of node configurations including a default configuration and a JMS node configuration. A standard node configuration is employed along with the JMS node configuration, where the standard node configuration may inherit the core or default configuration, an application configuration, the JMS configuration, etc. In one embodiment, as described elsewhere in this document, using configuration template 916 and node configuration module 918, the JMS configuration is used such that JMS nodes 924, 926 are created to run the JMS load.

In one embodiment, administrative tools are provided to access configuration services to inspect and modify configuration information. These administrative tools may include a graphical user interface (GUI) and/or a shell console (e.g., command line driven interface). An administrative tool may include a Web-based administrative tool. An administrative tool may also provide a GUI, which may be a swing-based GUI. A Swing-based GUI refers to a GUI that is based on the Swing API provided by, for example, the Java 2 Platform, Standard Edition (J2SE), Specification, 1.4.2, Nov. 20, 2003.

Figure 10:
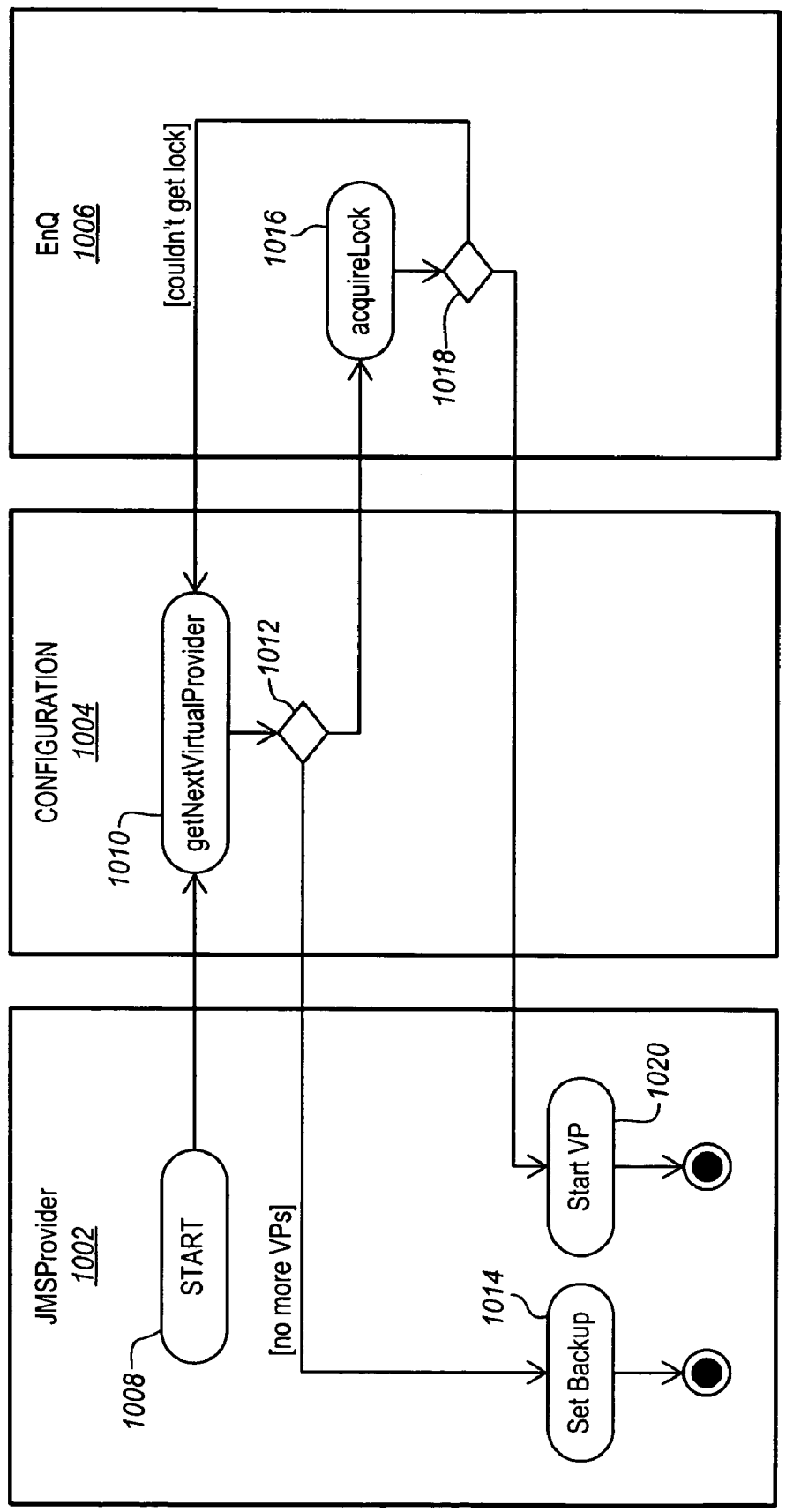
FIG. 10 illustrates an embodiment of a transaction sequence for a Message Oriented Middleware virtual provider distribution.

FIG. 10 illustrates an embodiment of a transaction sequence 1000 for a Message Oriented Middleware virtual provider distribution. An example of an MOM virtual provider distribution includes a JMS virtual provider distribution. In one embodiment, JMS provider service 1002 at each node (e.g., JVM) at a corresponding responsible instance (e.g., JMS instance, etc.) starts 1008 iterating over each of JMS virtual providers 1010 at configuration (e.g., JMS configuration) 1004. Each virtual provider may be part of configuration 1004. A JMS provider service starts 1008 and a node (e.g., JMS node) looks for the next JMS virtual provider 1010 at configuration 1004. In one embodiment, the selection of an available JMS virtual provider 1010 is performed by a JMS node using a virtual provider selection module (selection module). The selection module may also include a lock acquiring module which is to facilitate the acquiring of the lock 1016 for the corresponding virtual provider that the JMS node is seeking. In one embodiment, the lock acquiring module may be separate from, but in communication with, the selection module. At decision block 1012, if no virtual providers are found, the JMS provider service regards the JMS node that is not associated with a JMS virtual provider as a backup JMS node 1014 and registers the listeners for cluster events to be informed if a JMS node fails so that the backup JMS node can take over. In one embodiment, a module, such as the selection module, may be used to classify the JMS node as a backup node that fails to acquire a JMS virtual provider. If such an event occurs, the process starts over and the JMS provider service facilitates the backup JMS node to acquire a virtual provider that is now available because of the abandonment of the virtual provider due to a failed JMS node. A JMS node may fail or crash for various system or memory-related reasons, such as an out of memory error, a system resource consumption exceeding a predetermined threshold, etc.

Referring back to decision block 1012, if there is a JMS virtual provider available, the lock for that virtual provider is acquired 1016 at ENQ server 1006. ENQ server 1006 may hold locks to all virtual providers. ENQ server 1006 and its content may apply to both JMS instances and other standard instances. At decision block 1018, a determination is made as to whether the lock can be acquired. If the lock to a virtual provider is obtained, the JMS provider service starts that virtual provider 1020 at the requesting or corresponding or available JMS node. If obtaining the lock fails, the next virtual provider is tried 1010 until a lock can be acquired or the list of configured virtual providers is fully iterated.

Figure 11:
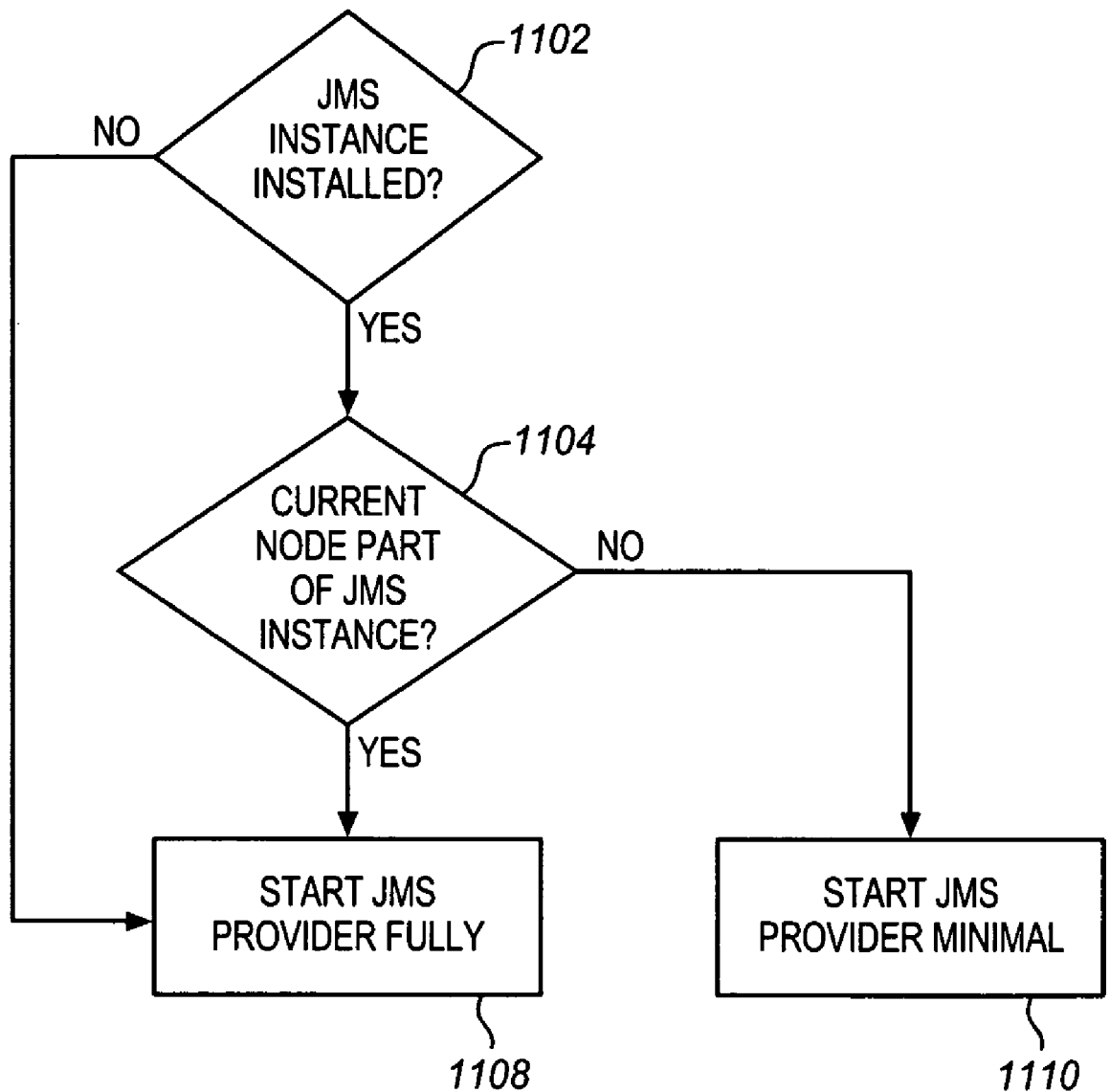
FIG. 11 illustrates an embodiment of a process for a Message Oriented Middleware instance installation.

FIG. 11 illustrates an embodiment of a process for a Message Oriented Middleware instance installation. An example of an MOM instance includes a JMS instance. In one embodiment, a JMS instance is installed just as a standard dialog instance. However, a JMS instance is different from a standard dialog instance or a J2EE instance in that the JMS instance uses a special JMS configuration template to start and run JMS provider service and various services required by it, such as running a JMS virtual provider at a JMS node (e.g., JVM). Furthermore, a JMS configuration template may override the settings for the share of heap available to the JMS node that is used for JMS cache with a much bigger value than the value available that is typically in a standard dialog instance.

To determine whether a JMS virtual provider is to be fully started on a current JMS node, first, a determination is made as to whether a JMS instance is installed at decision block 1102. If not, the JMS provider service is fully started at processing block 1108. The process that follows processing block 1108 is further illustrated and described with reference to FIG. 10. The full start of a JMS provider may include an installation of a JMS instance. In one embodiment, the fully starting of the JMS provider service includes a JMS node to run a JMS virtual provider by seeking an available JMS virtual provider from all virtual providers available in configuration. Seeking the available JMS virtual provider may also include a JMS node acquiring a lock for the JMS virtual provider from ENQ server. If the lock is not acquired, the process continues with the JMS node continuing to seek another available node until there are no more virtual providers, in which case the JMS node is regarded as a backup node. If, however, a JMS virtual provider is available and the lock for it is successfully acquired, the JMS node hosts and runs the JMS virtual provider. In one embodiment, the selection of an available JMS virtual provider is performed by a JMS node using a virtual provider selection module (selection module). The selection module may also include a lock acquiring module which is to facilitate the acquiring of the lock for the virtual provider that the JMS node is seeking. In one embodiment, the lock acquiring module may be separate from, but in communication with, the selection module. Also, in one embodiment, a module, such as the selection module, may be used to classify the JMS node that fails to acquire a JMS virtual provider as a backup node.

If a JMS instance is installed, at decision block 1104, a decision is made as to whether the current node is part of the JMS instance. If the current node is part of the JMS instance, the JMS provider service is fully started at processing block 1108. If the current node is not part of the JMS instance, the JMS provider service is started with minimal use at processing block 1110.

Figure 12:
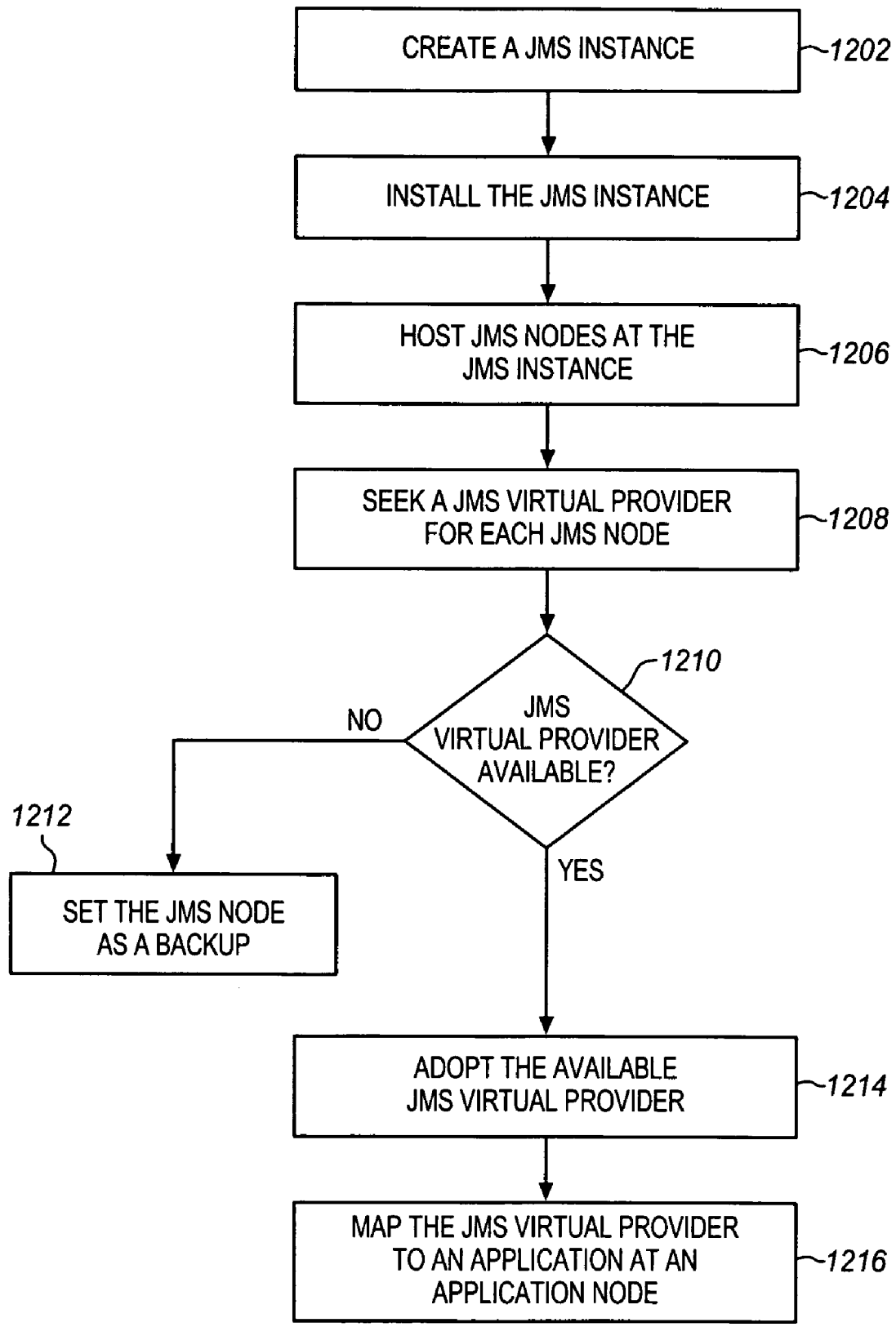
FIG. 12 illustrates an embodiment of a process for Message Oriented Middleware virtual provider distribution.

FIG. 12 illustrates an embodiment of a process for Message Oriented Middleware virtual provider distribution. An MOM virtual provider distribution includes a JMS virtual provider distribution. At processing block 1202, a JMS instance is created using one or more JMS instance configuration modules. At processing block 1204, the JMS instance is installed to host JMS nodes (e.g., JVM). The JMS nodes are hosted at the JMS instance at processing block 1206. The JMS nodes are created using one or more configuration templates, one or more node configuration modules, etc. At processing block 1208, each JMS node seeks a JMS virtual provider to be processed at the node. At decision block 1210, a determination is made as to whether a JMS virtual provider is available for the JMS node requesting or seeking it. If there are no JMS virtual providers available, the JMS node is regarded as a backup node and is used to takeover an abandoned virtual provider if a JMS node that is already in operation fails at processing block 1212.

Referring back to decision block 1210, if there is a virtual provider available, it is adopted by the JMS node seeking it at processing block 1214. In one embodiment, before a JMS virtual provider can be adopted by a JMS node, the JMS node acquires the lock for one of the available JMS virtual providers from the ENQ server. If the lock is not allowed, the JMS node continues to seek another available JMS virtual provider for which the lock can be acquired. If, however, the lock is acquired, the JMS node hosts and runs the JMS virtual provider. At processing block 1216, the JMS virtual provider running at the JMS node residing at the JMS instance is mapped to the corresponding application running at an application node.

Figure 13:
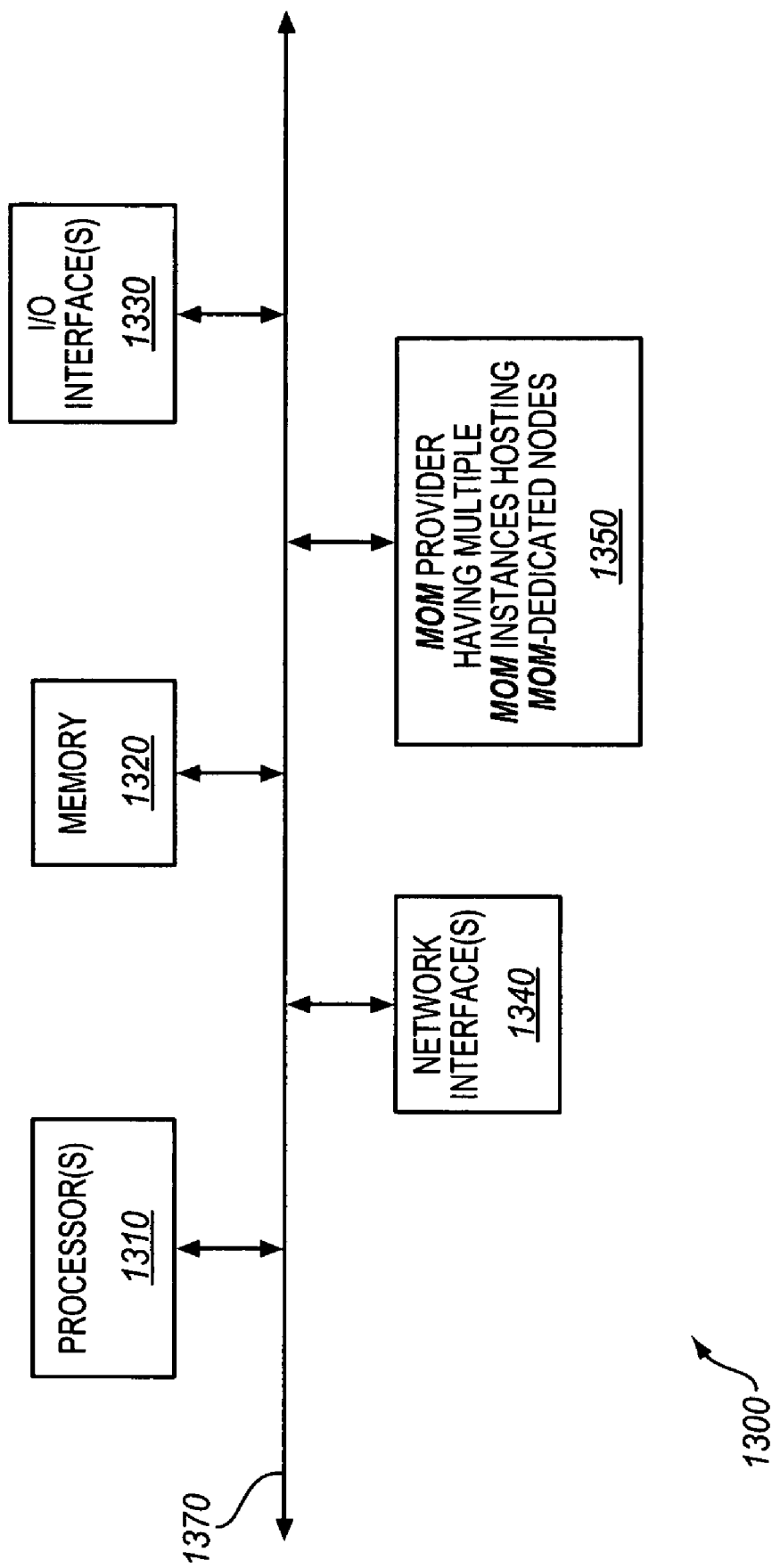
FIG. 13 illustrates a computing device implemented according to an embodiment of the invention.

FIG. 13 illustrates a computing device 1300 implemented according to one embodiment of the invention. Computing device 1300 may include: processor(s) 1310, memory 1320, one or more Input/Output interfaces 1330, network interface(s) 1340, and MOM/MOM provider 1350 having multiple and separate JMS instances that host JMS nodes that are dedicated to running JMS and not applications or other system operations. The illustrated elements may be connected together through system interconnection 1370. Processor(s) 1310 may include a microprocessor, microcontroller, field programmable gate array (FPGA), application specific integrated circuit (ASIC), central processing unit (CPU), programmable logic device (PLD), and similar devices that access instructions from system storage (e.g., memory 1320), decode them, and execute those instructions by performing arithmetic and logical operations.

The MOM provider having multiple server instances 1350 enables computing device 1300 to provide a scalable MOM provider for an enterprise network. MOM provider having multiple server instances 1350 may be executable content, control logic (e.g., ASIC, PLD, FPGA, etc.), firmware, or some combination thereof, in an embodiment of the invention. In embodiments of the invention in which MOM provider having multiple server instances 1350 is executable content, it may be stored in memory 1320 and executed by processor(s) 1310.

Memory 1320 may encompass a wide variety of memory devices including ROM, erasable programmable read-only memory (EPROM), electrically erasable programmable read-only memory (EEPROM), RAM, non-volatile random access memory (NVRAM), cache memory, flash memory, and other memory devices. Memory 1320 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1320 may store program modules such as routines, programs, objects, images, data structures, program data, and other program modules that perform particular tasks or implement particular abstract data types that facilitate system use.

One or more I/O interfaces 1330 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 1370 permits communication between the various elements of computing device 1300. System interconnection 1370 may include a wide variety of signal lines including one or more of a memory bus, peripheral bus, local bus, host bus, bridge, optical, electrical, acoustical, and other propagated signal lines.

One or more modules may include hardware, software, and/or a combination of these. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

The architectures and methodologies discussed herein may be implemented with various types of computing systems such as an application server that includes a J2EE server that supports EJB components and EJB containers (at the business layer) and/or Servlets and JSP (at the presentation layer). Of course, other embodiments may be implemented in the context of various different software platforms including, by way of example, Microsoft® NET, Windows®/NT, Microsoft Transaction Server (MTS), the ABAP platforms developed by SAP AG and comparable platforms.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

In the foregoing description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other cases, control structures, gate level circuits and full software instruction sequences have not been shown in detail in order not to obscure the invention. Those of ordinary skill in the art, with the included descriptions, will be able to implement appropriate functionality without undue experimentation.

Throughout the description, for the purposes of explanation, numerous specific details are set forth in order to provide a thorough understanding of the embodiments of the present invention. It will be apparent, however, to one skilled in the art that the present invention may be practiced without some of these specific details. In other cases, well-known structures and devices are shown in block diagram form to avoid obscuring the underlying principles of the present invention.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

identifying that a first MOM client and a first MOM virtual provider are to be installed on a first node of an application server, the first MOM virtual provider to provide a message service to facilitate communication between the first MOM client and a second MOM client;

based on the identifying, using a processor to provide a second node of the application server to run the first MOM client and provide a third node of the application server to run the first MOM virtual provider, the third node being dedicated to the running of the first MOM virtual provider;

based on the providing of the second node and the providing of the third node, installing the first MOM client onto the second node and installing the first MOM virtual provider onto the third node;

wherein the first MOM virtual provider is a first one of a plurality of MOM virtual providers;

the third node is a first one of a plurality of MOM nodes;

each of the plurality of MOM nodes is dedicated to running a respective one of the plurality of MOM virtual providers; and each of the plurality of MOM virtual providers is included in a first instance of a MOM provider, the first instance having a namespace that is separate from a second instance of the MOM provider;

configuring the first instance to host the plurality of MOM nodes;

seeking a second one of the plurality of MOM virtual providers to run on a second one of the plurality of MOM nodes; and based on a failure of the seeking, designating the second one of the plurality of MOM node as a backup node.

2. The method of claim 1, further comprising:
  detecting that the third node has failed;
  responsive to the detecting, finding the first MOM virtual provider to run on the backup node; and
  based on a success of the finding, mapping the backup node to the first application node.

3. The method of claim 1, further comprising:
  determining that the first instance has been installed;
  responsive to the determining, ascertaining that a second MOM virtual provider is one of the plurality of MOM virtual providers; and
  responsive to the ascertaining, performing a full start of the second MOM virtual provider, the full start including seeking one of the plurality of MOM nodes to run the second MOM virtual provider.

4. The method of claim 3, further comprising:
  responsive to the determining, discovering that the second MOM virtual provider is not one of the plurality of MOM virtual providers; and
  responsive to the discovering, performing a minimal start of the second MOM virtual provider, the minimal start not enabling a full use of the second MOM virtual provider.

5. The method of claim 1, wherein the second node is the same as the first node.

6. The method of claim 1, further comprising mapping the third node to the second node, the mapping of the second node to the third node including mapping the MOM virtual provider to the first MOM client.

7. A system comprising:
  an identification module to identify that a first MOM client and a first MOM virtual provider are to be installed on a first node of an application server, the first MOM virtual provider to provide a message service to facilitate communication between the first MOM client and a second MOM client;
  a processor-implemented separation module to, based on the identifying, provide a second node of the application server to run the first MOM client and provide a third node of the application server to ran the first MOM virtual provider, the third node being dedicated to the running of the first MOM virtual provider;
  a MOM instance template to, based on the providing of the second node and the providing of the third node, install the first MOM client onto the second node and install the first MOM virtual provider onto the third node;
    wherein the first MOM virtual provider is a first one of a plurality of MOM virtual providers;
    the third node is a first one of a plurality of MOM nodes;
    each of the plurality of MOM nodes is dedicated to running a respective one of the plurality of MOM virtual providers; and
    each of the plurality of MOM virtual providers is included in a first instance of a MOM provider, the first instance having a namespace that is separate from a second instance of the MOM provider;
  a configuration template to configure the first instance to host the plurality of MOM nodes;
  a lock acquiring module to seek a second one of the plurality of MOM virtual providers to run on a second one of the plurality of MOM nodes; and
  a selection module to, based on a failure of the seeking, designate the second one of the plurality of MOM node as a backup node.

8. The method of claim 7, further comprising:
  a listener to detect that the third node has failed;
  wherein, responsive to the detecting, the lock acquiring module is further to find the first MOM virtual provider to run on the backup node; and
  a node mapping module to, based on a success of the finding, map the backup node to the first application node.

9. The method of claim 7, further comprising:
  a processing module to:
    determine that the first instance has been installed;
    responsive to the determining, ascertain that a second MOM virtual provider is one of the plurality of MOM virtual providers; and
    responsive to the ascertaining, perform a full start of the second MOM virtual provider, the full start including seeking one of the plurality of MOM nodes to run the second MOM virtual provider.

10. The system of claim 9, wherein the processing module is further to:
  responsive to the determining, discover that the second MOM virtual provider is not one of the plurality of MOM virtual providers; and
  responsive to the discovering, perform a minimal start of the second MOM virtual provider, the minimal start not enabling a full use of the second MOM virtual provider.

11. An article of manufacture comprising a non-transitory machine-accessible medium having instructions that, when executed, cause a machine to:
  identify that a first MOM client and a first MOM virtual provider are to be installed on a first node of an application server, the first MOM virtual provider to provide a message service to facilitate communication between the first MOM diem and a second MOM client;
  based on the identifying, using a processor to provide a second node of the application server to run the first application and provide a third node of the application server to run the first MOM virtual provider, the third node being dedicated to the running of the first MOM virtual provider;
  based on the providing of the second node and the providing of the third node, install the first MOM client onto the second node and installing the first MOM virtual provider onto the third node;
    wherein the first MOM virtual provider is a first one of a plurality of MOM virtual providers;
    the third node is a first one of a plurality of MOM nodes;
    each of the plurality of MOM nodes is dedicated to running a respective one of the plurality of MOM virtual providers; and
    each of the plurality of MOM virtual providers is included in a first instance of a MOM provider, the first instance having a namespace that is separate from a second instance of the MOM provider;
  configure the first instance to host the plurality of MOM nodes;
  seek a second one of the plurality of MOM virtual providers to run on a second one of the plurality of MOM nodes; and
  based on a failure of the seeking, designate the second one of the plurality of MOM node as a backup node.

12. The article of manufacture of claim 11, wherein the non-transitory machine-accessible medium has further instructions that, when executed, cause the machine to:
  detect that the third node has failed;
  responsive to the detecting, find the first MOM virtual provider to run on the backup node; and based on a success of the finding, map the backup node to the first application node.

13. The article of manufacture of claim 11, wherein the non-transitory machine-accessible medium has further instructions that, when executed, cause the machine to:
   determine that the first instance has been installed;
   responsive to the determining, ascertain that a second MOM virtual provider is one of the plurality of MOM virtual providers; and
   responsive to the ascertaining, perform a full start of the second MOM virtual provider, the full start including seeking one of the plurality of MOM nodes to run the second MOM virtual provider.

14. The article of manufacture of claim 11, wherein the non-transitory machine-accessible medium has further instructions that, when executed, cause the machine to:
   responsive to the determining, discover that the second MOM virtual provider is not one of the plurality of MOM virtual providers; and
   responsive to the discovering, perform a minimal start of the second MOM virtual provider, the minimal start not enabling a full use of the second MOM virtual provider.

* * * * *